United States Patent

Ando et al.

[15] 3,642,568
[45] Feb. 15, 1972

[54] POLYAMIDE COMPOSITE FILAMENTS HAVING AN IMPROVED LATENT CRIMPABILITY

[72] Inventors: Satoshi Ando; Yusaku Tanaka, both of Osaka; Sadao Onuma, Kobe; Fumimaro Ogata, Osaka, all of Japan

[73] Assignees: SNIA UISCOSA Societa Nazionale Industria Applicazioni Viscosa S.p.A., Milan, Italy; Kanegafuchi Boseki Kabushiki Kaisha, Tokyo, Japan

[22] Filed: July 17, 1969

[21] Appl. No.: 842,736

Related U.S. Application Data

[63] Continuation-in-part of Ser. No. 625,985, Mar. 27, 1967, abandoned.

[52] U.S. Cl. ............................................. 161/173, 161/177
[51] Int. Cl. ................................................... D02g 3/04
[58] Field of Search ............... 161/173, 175, 177; 264/171, 264/DIG. 26

[56] References Cited

UNITED STATES PATENTS 2,130,523   9/1938   Carothers ........................... 260/78
3,118,011   1/1964   Breen .............................. 264/DIG. 26
3,515,703   6/1970   Yeda et al. ........................ 161/173 X

FOREIGN PATENTS OR APPLICATIONS

40/25,173  11/1965   Japan ............................. 264/DIG. 26

Primary Examiner—Robert F. Burnett
Assistant Examiner—Linda C. Koeckert
Attorney—Stevens, Davis, Miller & Mosher

[57] ABSTRACT

Polyamide composite filaments having an improved latent crimpability wherein two different fiber-forming polyamide components are mutually bonded and eccentrically disposed over the cross section of the filament, one of the components being a homopolyamide selected from the group consisting of polycaproamide and hexamethylene adipamide and the other of the components being a copolyamide which contains in its main molecular chain at least one polymeric structural unit derived from equimolar amounts of a dibasic acid and a diamine, at least one of said dibasic acid and said diamine having not more than four carbon atoms, the average number of moles of amide-linkages in the main molecular chain of said copolyamide being 5 to 15 per kilogram of polymer.

1 Claim, No Drawings

POLYAMIDE COMPOSITE FILAMENTS HAVING AN IMPROVED LATENT CRIMPABILITY

This application is a continuation-in-part of the copending application Ser. No. 625,985 filed Mar. 27, 1967, now abandoned.

The present invention relates to polyamide composite filaments having an improved latent crimpability wherein two different fiber-forming polyamide components are mutually bonded and eccentrically disposed over the cross section of the filament, characterized in that novel combinations of polyamides are used as said two components to be bonded.

Hitherto it has been well known that composite filaments in which two fiber-forming polymer components having different physical and chemical properties such as heat shrinkability or swellability are bonded eccentrically throughout the entire length of the filaments, develop spiral three-dimensional crimps upon exposure to heat or a swelling agent under relaxed conditions.

As the above two components, homopolyamides are used advantageously in combination with copolyamides because of their high spinnability, because they show similar melting points and melt-viscosities as well as satisfactory mutual adhering properties. For instance, when polycaproamide is used as one component, it has been a most general method to use as the other component a copolymer obtained by polycondensing ε-caprolactam with a salt of diamine with dibasic acid each having six or more carbon atoms. However, such homopolyamides and copolyamides have relatively similar chemical and physical structures, so that crimpability latent in the obtained composite filament is poor and desired bulkiness and covering power of the crimped composite filament cannot be brought about.

An object of the present invention is to provide polyamide composite filaments having an excellent latent crimpability.

Another object of the present invention is to provide crimped composite filaments having high bulkiness and covering power.

A further object of the present invention is to provide composite filaments economically by using raw materials of low cost.

The present invention consists in polyamide composite filaments having an improved latent crimpability, which are obtained by simultaneously spinning together through the same spinneret orifice two different fiber-forming synthetic linear polymer components to form unitary filaments in which said components are eccentrically disposed towards each other in distinct zones with adjoining surfaces being in intimate adhering contact with each other, each of said components extending throughout the length of said filaments, one of said components being a homopolyamide selected from polycaproamide and polyhexamethylene adipamide, the other component being a copolyamide which contains in its main molecular chain at least one polymeric structural unit derived from equimolar amounts of a dibasic acid and a diamine, at least one of said dibasic acid and said diamine having not more than four carbon atoms, the average number of moles of amide-linkages in the main molecular chain of said copolyamide being 5 to 15 per kilogram of polymer.

It has been well known that the crimpability of composite filaments is based on the difference in shrinkability between the two components constituting the filament, and the inventors have investigated the relation between the shrinkability and the chemical structure of polyamides to find that the shrinkability of polyamides is highly influenced by the number of amide-linkages in the main molecular chain, and the present invention has been achieved.

That is to say, it has been found that the shrinkability of polyamide filaments depends upon the concentration of amide-linkages with respect to methylene radicals in the polymeric structural unit and upon the number of moles of amide-linkages in the main molecular chain of the polymer, and that the higher they are, the greater the shrinkability. Based on this, the crimpability of polyamide composite filaments has been successfully increased by introducing into the main molecular chain of a copolyamide of one component of the composite filament, at least one polymeric structural unit derived from equimolar amounts of a dibasic acid and a diamine, at least one of said dibasic acid and said diamine having not more than four carbon atoms, whereby the concentration of amide-linkages with respect to methylene radicals is increased and further the number of moles of amide-linkages in the main molecular chain of the copolyamide is increased.

Thus polyamides containing a polymeric structural unit derived from a dibasic acid and a diamine, at least one of said dibasic acid and said diamine having not more than four carbon atoms, in its main molecular chain have never so far been used as filament-forming materials because they have drawbacks in melt-spinnability and in strength, elongation and Young's Modulus as monofilaments but a useful application of these polyamides for composite filaments has been developed by the present invention.

The term "average number of moles of amide-linkages contained in the main molecular chain of polyamide" used herein means average number of moles of amide-linkage per kilogram of polymer. In the case that ω-lactams or ω-aminoacids are used as the raw materials for the polyamide, the average number can be calculated as that 1 mole of amide-linkage is contained in 1 mole of polymeric structural unit, while when a nylon salt of diamine and dibasic acid is employed, it may be calculated as that 1 mole of polymeric structural unit contains 2 moles of amide-linkage. For instance, polycaproamide and polyhexamethylene adipamide which consists respectively of polymeric structural units $-HN(CH_2)_5CO-$ and $-HN(CH_2)_{62})_4CO-$ have 8.9 moles of amide-linkage per kilogram of polymer on an average. Furthermore, in the case of a copolyamide which comprises two or more polymeric structural units, the average number of amide-linkages to be contained in homopolyamide composed of each of the above polymeric structural units is calculated and then the average number of amide-linkages contained in the copolyamide is estimated from the above each calculated value according to the amount of each polymeric structural unit in the copolyamide. For example, a copolyamide consisting of 80 percent by weight of polycaproamide and 20 percent by weight of polyhexamethylene sebacamide which has been hitherto used as a component of conventional polyamide composite filaments has 8.5 moles of amide-linkage per kilogram of polymer on an average.

The average number of moles of amide-linkages contained in the main molecular chain of copolyamide employed for the present invention is from 5 to 15 and preferably from 7 to 13 per kilogram of polymer. If the average number of moles of amide-linkages is less than 5, the shrinkability decreases to such an extent that a satisfactory crimpability of the composite filament can hardly be obtained, while when the average number of moles of amide-linkages is more than 15, hydroscopicity and swellability are so excessive in the obtained filament that the physical properties of the filament are lowered considerably, and these filaments are not suitable for a practical use.

Moreover, the copolyamides hitherto used generally, which contain structural units derived from dibasic acids and diamines, at least one of said dibasic acids and said diamines having more than five carbon atoms, in the main molecular chain, do not give high shrinkability, even though the average number of moles of amide-linkages falls within the above-mentioned range, so that it is essential that at least one of said dibasic acid and said diamine to constitute the structural units of the copolyamide has not more than four carbon atoms and that the average number of moles of amide-linkages therein is within the above-mentioned range in order to achieve the object of the present invention.

Copolyamides to be employed in this invention which contain polymeric structural units derived from diamines or dibasic acids, at least one of said dibasic acids and said diamines having not more than four carbon atoms, in the main molecular chain, can be produced by copolymerizing a conventional polyamide-forming monomer with a salt of one or more diamines, such as, ethylenediamine, propylenediamine, tetramethylenediamine with conventional nylon-forming dibasic acids, or salts of one or more dibasic acids, such as, malonic acid, succinic acid with conventional nylon-forming diamines. As valuable members of this class may be mentioned poly(carproamide/ethylene adipamide), poly(caproamide/ethylene sebacamide), poly(caproamide/ethylene terephthalamide), poly(caproamide/ethylene isophthalamide), poly(caproamide/tetramethylene adipamide), poly(caproamide/tetramethylene isophthalamide), poly(caproamide/ethylene succinamide), poly(caproamide/hexamethylene malonamide), poly(caproamide/nonamethylene succinamide), poly(hexamethylene adipamide/ethylene adipamide), poly(hexamethylene adipamide/ethylene terephthalamide), poly(hexamethylene adipamide/tetramethylene malonamide), poly(hexamethylene adipamide/propylene isophthalamide), poly(hexamethylene sebacamide/ethylene isophthalamide) and poly(hexamethylene sebacamide/hexamethylene succinamide).

Thus, according to the invention, composite filaments having an improved crimpability, which have never so far been obtained, may be provided, because there is a considerable difference in the shrinkability between the two components constituting the composite filaments. Moreover, diamines or dibasic acids having not more than four carbon atoms can be obtained in a low cost as compared with the other raw materials for polyamides, so that the cost of production can be lowered.

In the present invention, the conjugate ratio of the two components can be varied suitably, and moreover the bonding form of two components may be either in a side-by-side relation or an eccentric sheath and core relation along the entire length of the filament.

The cross section of the composite filament obtained according to the invention may be noncircular as well as circular.

The composite filament obtained according to the invention can be used for continuous filament or staple fiber. Moreover, the composite filament obtained according to the invention can be improved remarkably in its crimpability and covering property as compared with that obtained by the conventional methods, so that it can be used widely for various fabrics, knitted goods, piled articles, etc.

Moreover, crimps of the composite filament obtained according to the present invention can be developed either before or after producing finished goods.

The following examples are given in illustration of the invention and are not intended as limitations thereof.

The crimpability shown in the following examples was determined as follows: that is, bundles consisting of 40 filaments cut into 30 cm. length were hung with various weights, and then in such a state dipped in hot water at 95° C. for 15 minutes to develop crimps, after which they were dried in air, and then percents of shrinkage for the initial length were measured. Next, loads calculated per denier and percents of shrinkage were plotted and the load at 50 percent of shrinkage was mentioned as half load value.

EXAMPLE 1

A mixture of 90 parts (by weight) of ε-caprolactam with 10 parts (by weight) of a salt of ethylenediamine with adipic acid was heated at 250° C. for 8 hours under nitrogen gas atmosphere to effect polycondensation. The copolyamide thus obtained (average number of moles of amide-linkages per kilogram of polymer was 9.1) and polycaproamide were conjugate spun at a conjugate ratio of 1:1 (by weight ratio) in a side-by-side relation to obtain a composite filament in which two components were arranged in side-by-side type relationship along the entire length of the filament. The obtained composite filament was drawn to 4.2 times its original length at room temperature to obtain a 15 denier composite filament.

The crimpability of above-mentioned composite filament was determined as above resulting in that its percent of shrinkage under no load was 90.2 percent, and its half load value was 1.2 mg./d.

In order to compare the above-mentioned composite filament with a conventional filament, conjugate spinning was carried out under the same condition as described above using a salt of hexamethylenediamine and adipic acid (in this case the average number of moles of amide-linkages of this copolyamide was 8.8) instead of the salt of ethylenediamine and adipic acid. In determining the crimpability of the resulting composite filament, the percent of shrinkage under no load was only 71 percent, and the half load value was only 0.15 mg./d.

EXAMPLE 2

A mixture of 92 parts (by weight) of caprolactam with 8 parts (by weight) of a salt of ethylenediamine and isophthalic acid was heated at 250° C. for 8 hours under a nitrogen gas atmosphere to effect polycondensation. The obtained copolyamide (average number of moles of amide-linkages per kilogram of polymer was 9.0) and polycaproamide were conjugate spun at 250° C. at a conjugate ratio of 1:1 (by weight ratio) in a side-by-side type relationship, and the spun filament was drawn to 4.4 times its original length to obtain a 13 denier composite filament. The obtained filament was measured with respect to its crimpability resulting in that percent of shrinkage under no load was 89.8 percent and half load value was 1.06 mg./d.

The same procedure was repeated except that a salt of undecamethylenediamine with isophthalic acid (in this case, the average number of moles of amide-linkages was 8.7 per kilogram of polymer) was used instead of the above-mentioned salt of ethylenediamine with isophthalic acid to obtain a composite filament, the percent of shrinkage of which was only 79.3 percent under no load and half load value was only 0.34 mg./d.

EXAMPLE 3

A mixture of 40 parts (by weight) of a salt of hexamethylenediamine with adipic acid, 60 parts (by weight) of a salt of tetramethylenediamine with sebacic acid and 50 parts (by weight) of water was introduced into an autoclave and prepolymerized at a temperature of 250° C. for 2 hours under a pressure of 25 kg./cm.$^2$, after which the resulting mass was heated and polycondensed under nitrogen gas atmosphere at 280° C. for 5 hours to obtain a copolyamide (average number of moles of amide-linkages of this polymer was 8.3). Then the obtained copolymer and polyhexamethylene adipamide were conjugate spun at a conjugate ratio of 1:1 (by weight ratio) in a side-by-side type relationship at 290° C., and then the extruded filament was drawn to 3.8 times its original length at room temperature to obtain an 18 denier composite filament.

The obtained composite filament had an excellent crimpability, and the percent of shrinkage under no load was 93 percent and the half load value was 1.8 mg./d.

The same procedure was repeated except that a salt of hexamethylenediamine with sebacic acid (in this case, the average number of moles of amide-linkages in the copolyamide was 7.8 per kilogram of polymer) was used instead of the salt of tetramethylenediamine with sebacic acid to obtain a composite filament, the percent of shrinkage of which was only 73 percent under no load and the half load value was only 0.62 mg./d.

EXAMPLE 4

A mixture of 88 parts (by weight) of caprolactam with 12 parts (by weight) of a salt of mixed diamines consisting of ethylenediamine and tetramethylenediamine in a mole ratio of 1:1 with terephthalic acid was heated an polycondensed under nitrogen gas atmosphere at a temperature of 250° C. for 8 hours to obtain a copolyamide (average number of moles of amide-linkages per kilogram of polymer was 9.0). Then the obtained copolyamide and polycaproamide were conjugate spun at a conjugate ratio of 1:1 (by weight ratio) in a side-by-side type relationship at a temperature of 250° C., after which the resulting filament was drawn to 4.4 times its original length to obtain a 15 denier composite filament. The composite filament obtained had an excellent crimpability, and the percent of shrinkage under no load was 92 percent, and the half load value was 1.25 mg./d.

The same procedure was repeated except that nonamethylenediamine and undecamethylenediamine (in this case the average number of moles of amide-linkages per kilogram of polymer was 8.6) was used instead of the above-mentioned ethylenediamine and tetramethylenediamine to obtain a composite filament, which was a very inferior filament, and the percent of shrinkage under no load was 75 percent, and the half load value was 0.15 mg./d.

EXAMPLE 5

A mixture of 20 parts (by weight) of caprolactam, 80 parts (by weight) of a salt of hexamethylenediamine with malonic acid and 50 parts (by weight) of water was introduced into an autoclave and prepolymerized at a temperature of 250° C. for 2 hours under a pressure of 25 kg./cm.$^2$, after which the resulting mass was heated and polycondensed at atmospheric pressure under nitrogen gas atmosphere at a temperature of 260° C. for 5 hours to obtain a copolyamide (average number of moles of amide-linkages per kilogram of polymer was 9.0). Then the obtained copolyamide and polycaproamide were conjugate spun at a conjugate ratio of 1:1 (by weight ratio) in a side-by-side type relationship at a temperature of 260° C., and then the resulting filament was drawn to 4.0 times its original length to obtain a 15 denier composite filament.

The obtained composite filament had an excellent crimpability, and the percent of shrinkage under no load was 95 percent and the half load value was 1.92 mg./d.

The same procedure was repeated except that a salt of hexamethylenediamine with sebacic acid (in this case, the average number of moles of amide-linkages per kilogram of polymer was 7.4) was used instead of the above-mentioned salt of hexamethylenediamine with malonic acid to produce a composite filament, the percent of shrinkage of which was only 81 percent under no load and the half load value was only 0.55 mg./d.

We claim:

1. Polyamide composite filaments having an improved latent crimpability manufactured by simultaneously spinning together through a common spinneret orifice two different fiber-forming synthetic linear polymer components to form unitary filaments, in which said components are eccentrically disposed towards each other in distinct zones with adjoining surfaces being in intimate adhering contact with each other, each of said components extending throughout the length of said filaments, one of said components being a homopolyamide selected from the group consisting of polycaproamide and hexamethylene-adipamide, and the other component being a copolyamide which contains in its main molecular chain at least one polymeric structural unit derived from equimolar amounts of a dibasic acid and a diamine, at least one of said dibasic acid and said diamine having not more than four carbon atoms, which is selected from the class consisting of poly(caproamide/ethylene adipamide), poly(caproamide/ethylene sebacamide), poly(caproamide/ethylene terephthalamide), poly(caproamide/ethylene isophthalamide), poly(caproamide/tetramethylene adipamide), poly(caproamide/tetramethylene isophthalamide), poly(caproamide/ethylene succinamide), poly(caproamide/hexamethylene malonamide), poly(caproamide/nonamethylene succinamide), poly(hexamethylene adipamide/ethylene adipamide), poly(hexamethylene adipamide/ethylene terephthalamide), poly(hexamethylene adipamide/tetramethylene malonamide), poly(hexamethylene adipamide/propylene isophthalamide), poly(hexamethylene sebacamide/ethylene isophthalamide) and poly(hexamethylene sebacamide/hexamethylene succinamide), the average number of moles of amide-linkages in the main molecular chain of said copolyamide being 5 to 15 per kilogram of polymer.

* * * * *

UNITED STATES PATENT OFFICE
CERTIFICATE OF CORRECTION

Patent No. 3,642,568    Dated February 15, 1972

Inventor(s) Satoshi Ando et al.

It is certified that error appears in the above-identified patent and that said Letters Patent are hereby corrected as shown below:

The Assignee's name should be changed from "SNIA UISCOSA" to -- SNIA VISCOSA --.

Signed and sealed this 18th day of June 1974.

(SEAL)
Attest:

EDWARD M. FLETCHER, JR.
Attesting Officer

C. MARSHALL DANN
Commissioner of Patents